United States Patent
Liang

(10) Patent No.: US 8,654,521 B2
(45) Date of Patent: Feb. 18, 2014

(54) ELECTRONIC DEVICE WITH ELECTROMAGNETIC RADIATION SHIELDING

(75) Inventor: An-Gang Liang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 404 days.

(21) Appl. No.: 13/193,615

(22) Filed: Jul. 29, 2011

(65) Prior Publication Data

US 2012/0257347 A1 Oct. 11, 2012

(51) Int. Cl.
*H05K 5/00* (2006.01)
*H05K 7/00* (2006.01)
*H01R 13/62* (2006.01)
*G11B 33/02* (2006.01)

(52) U.S. Cl.
USPC ............ 361/679.33; 361/679.34; 361/679.35; 361/679.37; 361/679.38; 361/679.57; 439/327; 439/328; 369/77.11

(58) Field of Classification Search
USPC ................. 361/679.31–679.4, 679.55–679.6, 361/724–727; 369/75.11, 75.21, 76, 77.11, 369/77.21, 78, 79, 80, 81, 82; 439/60, 439/151–160, 327, 328, 331, 638
See application file for complete search history.

(56) References Cited

U.S. PATENT DOCUMENTS

2004/0120107 A1\* 6/2004 Davis et al. .................... 361/683
2008/0043454 A1\* 2/2008 Titus ............................. 361/818

FOREIGN PATENT DOCUMENTS

AU 9956046 A \* 4/2001

\* cited by examiner

*Primary Examiner* — Jenny L Wagner
*Assistant Examiner* — Jerry Wu
(74) *Attorney, Agent, or Firm* — Altis Law Group, Inc.

(57) ABSTRACT

An electronic apparatus includes a chassis, a casing fixed in the chassis, a first resilient shielding plate and a second resilient shielding plate both made of electromagnetic radiation shielding material, and a drawer. The casing defines a receiving space. The drawer is slidably received in the receiving space. The first resilient shielding plate fits about a front end of the casing and abuts against the chassis. The second resilient shielding plate is fixed to a front end of the drawer, to abut against an inner surface of the casing bounding the receiving space.

4 Claims, 6 Drawing Sheets

ELECTRONIC DEVICE WITH ELECTROMAGNETIC RADIATION SHIELDING

BACKGROUND

1. Technical Field

The present disclosure relates to an electronic device able to shield electromagnetic radiation.

2. Description of Related Art

At present, electronic devices, such as computers, ordinarily define an optical disk drive bay for fixing a compact disk read-only memory (CD-ROM) drive therein.

A drawer is usually fixed in the optical disk drive bay to hold the CD-ROM drive. Surfaces of the drawer can become abraded over time with use. Additionally, clearance between the drawer and an inner surface of the optical disk drive bay will allow electromagnetic radiation to easily enter or exit the electronic device. Thus, electromagnetic interference between the electronic device and nearby electronic devices may occur.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
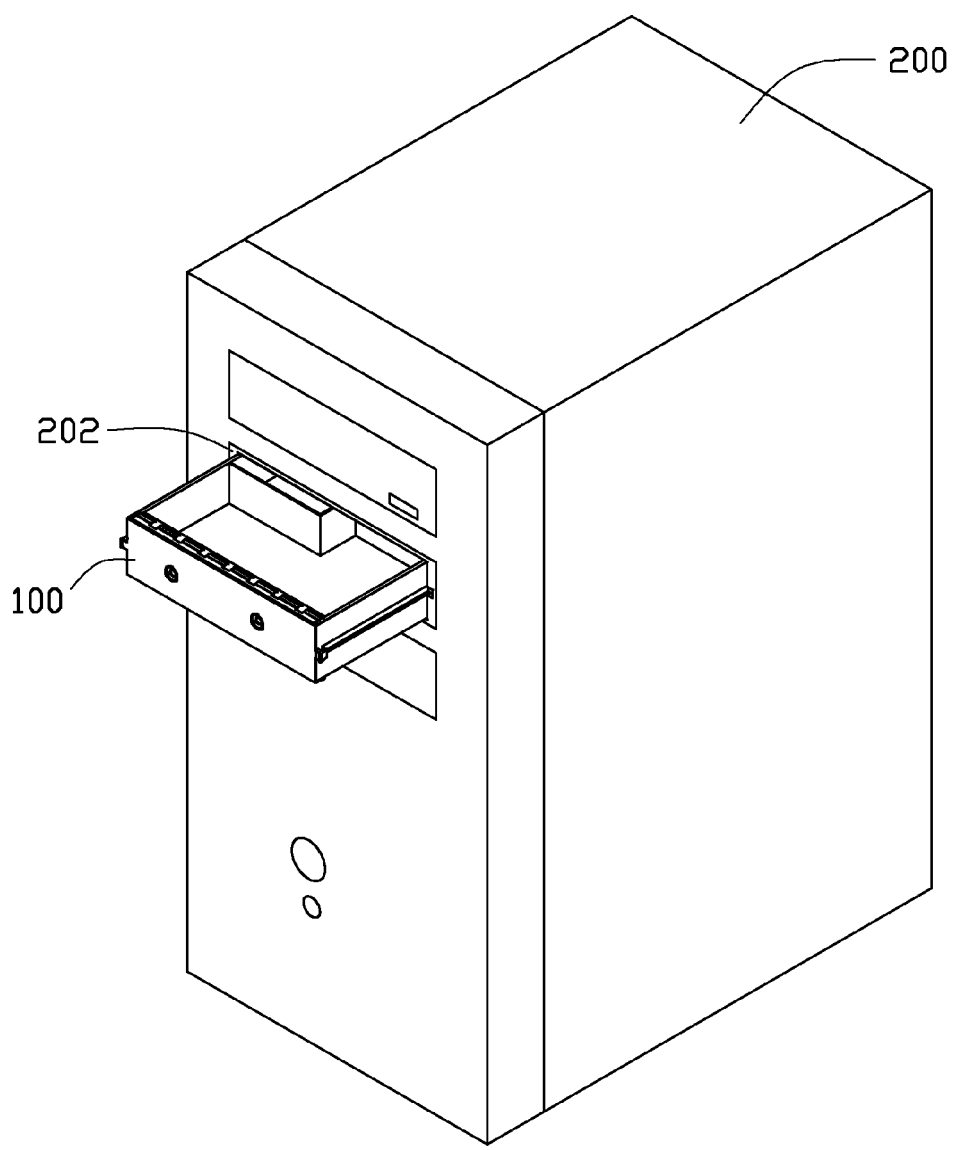
FIG. 1 is an isometric view of an exemplary embodiment of an electronic device, wherein the electronic device includes a storage apparatus.

Referring to FIG. 1, an exemplary embodiment of an electronic device includes a chassis 200 and a storage apparatus 100. An optical disk drive bay 202 is defined in the chassis 200. The storage apparatus 100 is received in the optical disk drive bay 202. In the embodiment, the electronic device is a computer.

Figure 2:
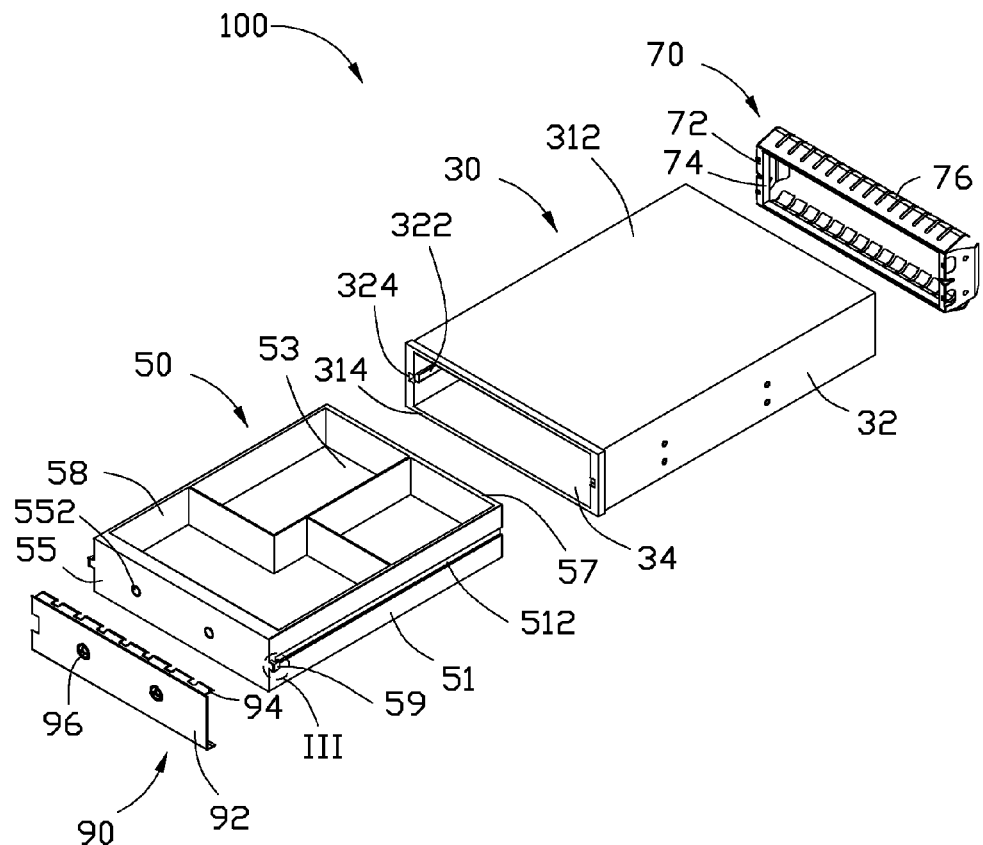
FIG. 2 is an exploded, isometric view of the storage apparatus of FIG. 1.
Figure 3:
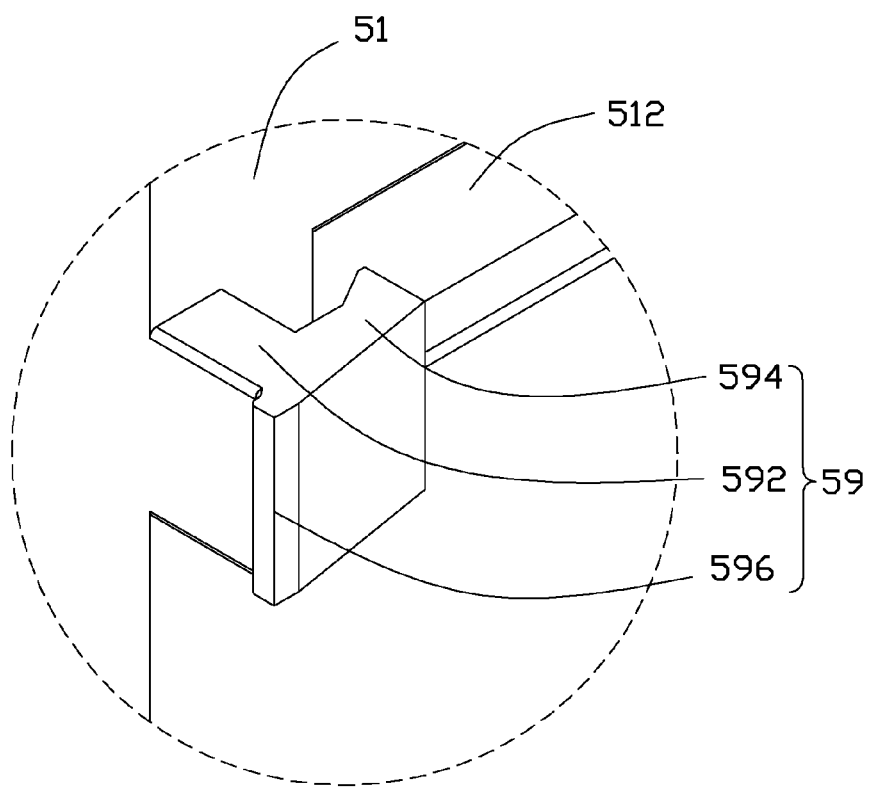
FIG. 3 is an enlarged view of the circled portion III of FIG. 2.

Referring to FIG. 2 and FIG. 3, the storage apparatus 100 includes a casing 30, a drawer 50, a first resilient shielding member 70, and a second resilient shielding member 90.

The casing 30 is a rectangular shell, and includes a top wall 312, a bottom wall 314 parallel to the top wall 312, and two sidewalls 32 connected to the top wall 312 and bottom wall 314. The sidewalls 32, the top wall 312, and the bottom wall 314 cooperatively bound a receiving space 34. A sliding bar 322 longitudinally protrudes from a middle of an inner surface of each sidewall 32. A guide hole 324 is defined in a front end of each sidewall 32, adjacent to the sliding bar 322. A substantially wedge-shaped latching block 326 (shown in FIG. 6) protrudes out from a front end of each sliding bar 322, and extends into the guide hole 324.

The drawer 50 includes a bottom plate 53, two parallel side plates 51 perpendicularly extending up from opposite sides of the bottom plate 53, a front plate 55 perpendicularly extending up from a front end of the bottom plate 53, and a rear plate 57 perpendicularly extending up from a rear end of the bottom plate 53. The side plates 51, the bottom plate 53, the front plate 55, and the rear plate 57 cooperatively bound a receiving space 58. A plurality of partitioning pieces extends from the bottom plate 53, to divide the receiving space 58 into a plurality of storage spaces. A slide slot 512 is longitudinally defined in a middle of an outer surface of each side plate 51. A rear end of each slide slot 512 extends through the rear plate 57. A resilient latching member 59 extends from a front end of the outer surface of each side plate 51, adjacent to the corresponding slide slot 512. Each latching member 59 includes a connecting portion 592 extending out from the side plate 51, a hook 594 extending rearward from a distal end of the connecting portion 592, and an operation portion 596 extending forward from the distal end of the connecting portion 592 away from the hook 594. Two screw holes 552 are defined in the front plate 55.

The first resilient shielding member 70 is made of electromagnetic radiation shielding material, such as steel. The first resilient shielding member 70 includes a rectangular fixing frame 72. A rectangular opening 74 is defined in the fixing frame 72. Four substantially V-shaped resilient abutting pieces 76 extend rearward from two sides and two ends of the fixing frame 72 respectively.

The second resilient shielding member 90 is made of electromagnetic radiation shielding material, such as steel. The second resilient shielding member 90 includes a rectangular fixing panel 92, and two substantially V-shaped resilient abutting pieces 94 extend rearward from two opposite sides of the fixing panel 92. Two fixing holes 96 are defined in the fixing panel 92.

Figure 4:
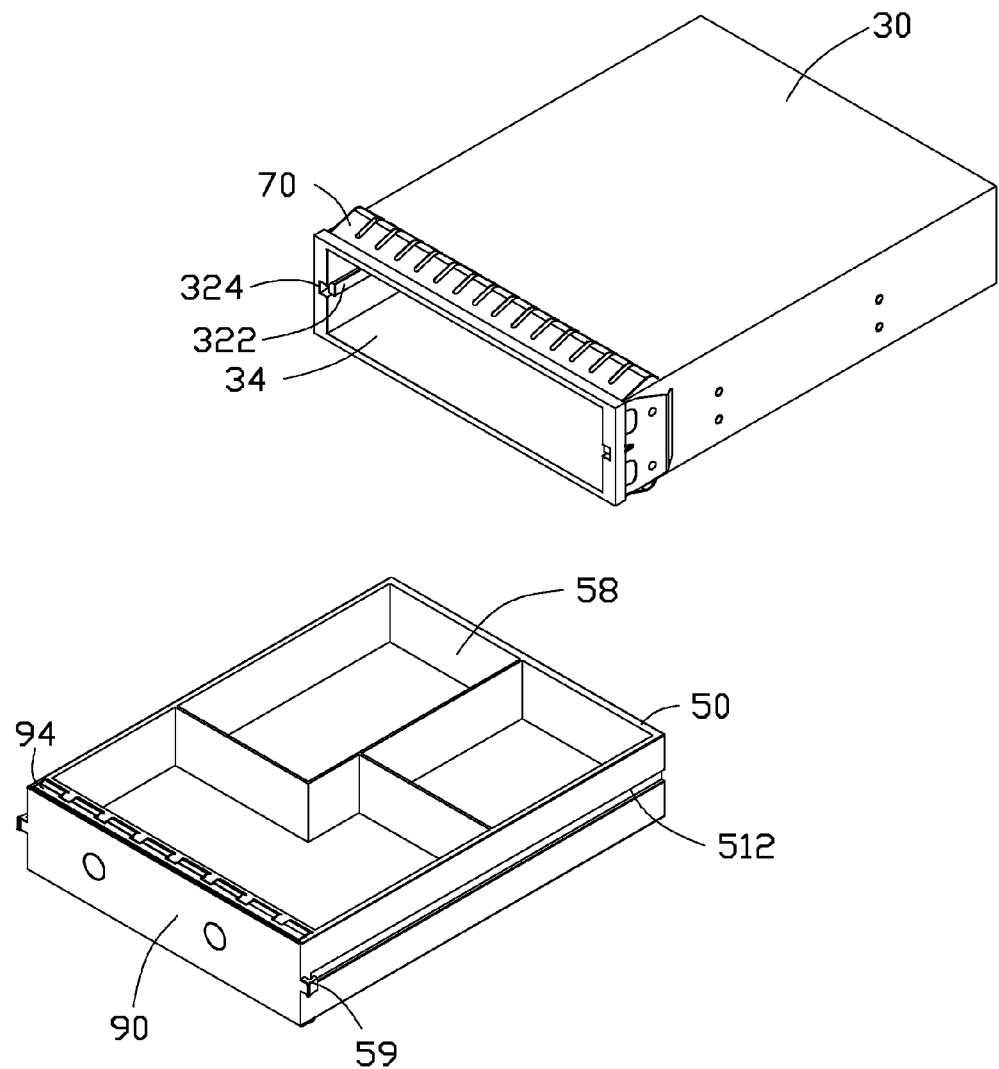
FIG. 4 is a partially assembled, isometric view of FIG. 2.
Figure 5:
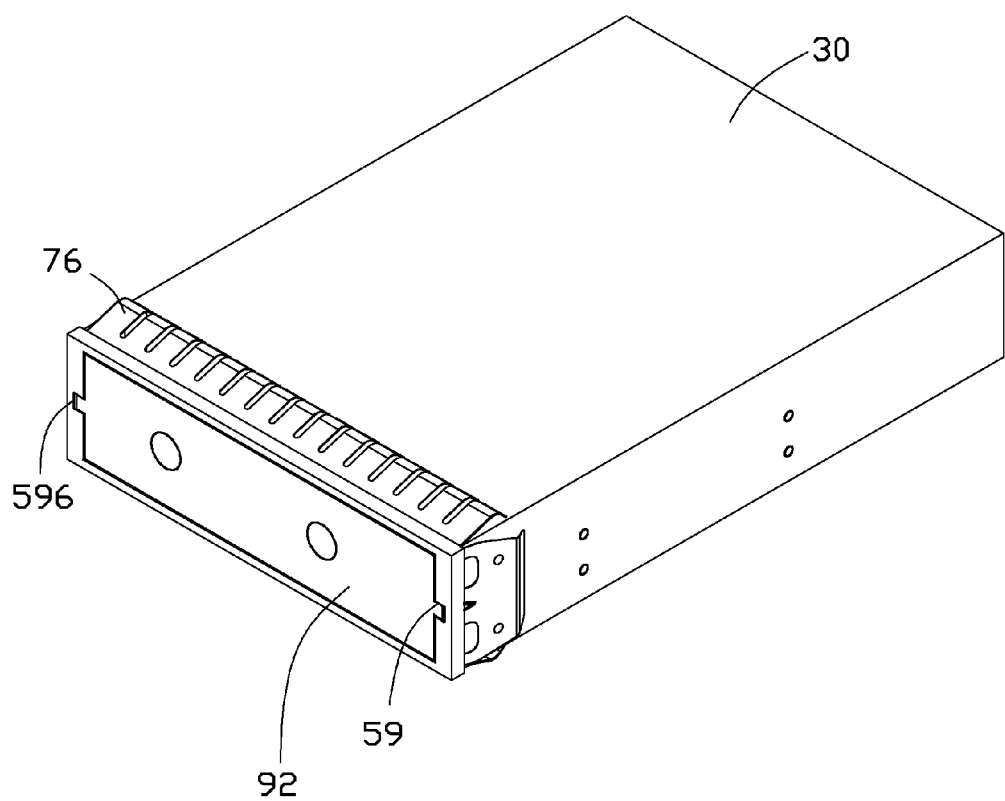
FIG. 5 is an assembled, isometric view of FIG. 4.
Figure 6:
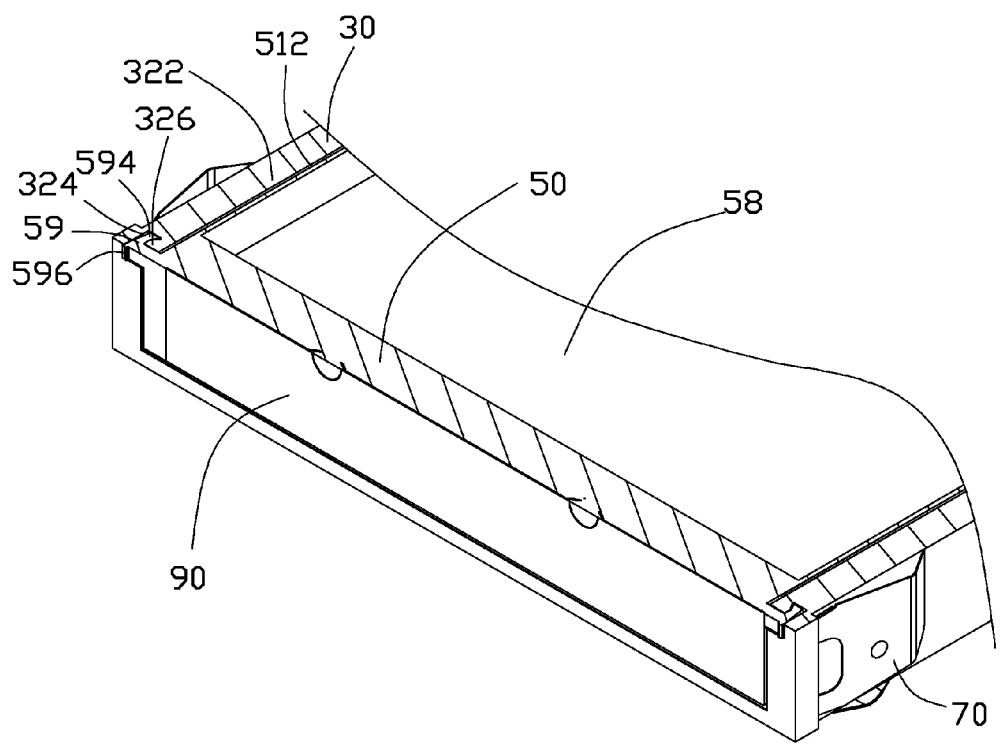
FIG. 6 is a partial, cutaway view of FIG. 5.

Referring to FIGS. 4-6, in assembly of the storage apparatus 100, the fixing frame 72 of the first resilient shielding member 70 fits about the front end of the casing 30. The abutting pieces 76 abut against the front end of the casing 30. Two screws extend through the fixing holes 96 to screw in the corresponding screw holes 552. The second resilient shielding member 90 is fixed to the front plate 55. The abutting pieces 94 abut against the front end of the drawer 50. The drawer 50 is slidably received in the receiving space 34, and the sliding bars 322 are slidably received in the slide slots 512. The hooks 594 are inserted into the corresponding guide holes 324, and resist against the latching blocks 326 of the casing 30, to be deformed away from each other. After the hooks 594 pass over the latching blocks 326, the hooks 594 are restored to latch the latching blocks 326, respectively. The abutting pieces 94 are resiliently sandwiched between the inner surfaces of the casing 30 and the drawer 50.

In assembly of the storage apparatus 100 to the chassis 200, the storage apparatus 100 is fixed in the optical disk drive bay 202 with screws. The abutting pieces 76 are resiliently sandwiched between the casing 30 and an inner surface of the optical disk drive bay 202.

In disassembling the drawer 50, the operation portions 596 are operated, to deform the hooks 594 away from each other. The hooks 594 are disengaged from the latching blocks 326. The drawer 50 is ready to be pulled out of the casing 30.

While the disclosure describes examples and embodiments, it is to be understood that the disclosure is not limited thereto. To the contrary, the disclosure is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device comprising: a chassis defining a disk drive bay; and a storage apparatus mounted within the disk drive bay, the storage apparatus comprising a casing, a drawer slidably received in the casing, a first resilient shielding member, and a second resilient shielding member; wherein the casing defines a receiving space, the drawer is slidably mounted in the receiving space, the first and second resilient shielding members are made of electromagnetic radiation shielding material, the first resilient shielding member fits about a front end of the casing and resists against an inner surface of the disk drive bay, the second resilient shielding member is fixed to a front end of the drawer and resists against an inner surface of the casing; and the casing comprises a top wall, a bottom wall parallel to the top wall, and two sidewalls connected in a substantially perpendicular manner between corresponding sides of the top wall and the bottom wall, wherein the sidewalls, the top wall, and the bottom wall cooperatively bound the receiving space, a sliding bar longitudinally protrudes from a middle of an inner surface of each sidewall, the drawer comprise a bottom plate, two parallel side plates perpendicularly extending up from opposite sides of the bottom plate, a front plate perpendicularly extending up from a front end of the bottom plate, and a rear plate perpendicularly extending up from a rear end of the bottom plate, a slide slot is longitudinally defined in a middle of an outer surface of each side plate, a rear end of the slide slot extends through the rear plate, the sliding bar is slidably received in a corresponding one of the slide slots; and a guide hole is defined in a front end of each sidewall, adjacent to the sliding bar, a latching block protrudes out from a front end of each sliding bar, extending into the guide hole, a resilient latching member extends from a front end of the outer surface of each side plate, adjacent to the corresponding slide slot, each latching member comprises a hook latching the latching block.

2. The electronic device of claim 1, wherein each latching member further comprises a connecting portion extending out from the side plate, and an operation portion extending forward from a distal end of the connecting portion, wherein the hook extends rearward from the distal end of the connecting portion away from the operation portion.

3. The electronic device of claim 1, wherein the second resilient member comprises a rectangular fixing panel fixed on the front plate of the drawer, and two substantially V-shaped first resilient abutting pieces extending rearward from top and bottom of the fixing panel, the first abutting pieces are resiliently sandwiched between the inner surfaces of the casing and the drawer.

4. The electronic device of claim 3, wherein the first resilient shielding member comprises a rectangular fixing frame fitting about the front end of the casing, and a plurality of substantially V-shaped second resilient abutting pieces extend rearward from sides of the fixing frame, the second abutting pieces are resiliently sandwiched between the casing and the inner surface of the disk drive bay.

* * * * *